United States Patent Office 2,885,332
Patented May 5, 1959

2,885,332
PRODUCTION OF KETOXIMES

Eugen Mueller and Dorla Fries, Tubingen, and Horst Metzger, Ludwigshafen (Rhine), Germany No Drawing. Application August 1, 1956
Serial No. 601,383

Claims priority, application Germany August 9, 1955

9 Claims. (Cl. 204—158)

This invention relates to an improved process for the production of ketoximes. It relates more specifically to improvements in the production of ketoximes from saturated hydrocarbons.

In the co-pending application S.N. 496,946, filed March 25, 1955, by Eugen Mueller, Horst Metzger and Dorla Fries for Production of Ketoximes a process for the production of ketoximes has been described according to which a mixture of nitrogen monoxide and chlorine which contains the nitrogen monoxide in a large molecular excess as compared with the chlorine is allowed to act in the presence of light, preferably that of a wave length of 350 to 700 millimicrons, on a liquid saturated cycloaliphatic or aliphatic hydrocarbon, the bis-nitrosocyclohexane formed as the main product and the 1-chlor-1-nitrosocyclohexane formed as a by-product being converted into cyclohexanone oxime by heating or/and by irradiation. This earlier filed application describes suitable initial materials which can be converted to ketoximes as including the saturated alkanes and cycloalkanes containing from 5 to 12 carbon atoms.

We have now found that the formation of bis-nitroso and 1-chlor-1-nitroso compounds can be bypassed and ketoximes or their hydrochlorides can be directly obtained by allowing dry hydrogen chloride, chlorine and nitrogen monoxide to act simultaneously on normally liquid saturated aliphatic or cycloaliphatic hydrocarbons while irradiating them with active light.

It is preferable first to saturate the hydrocarbon to be oximated with dry hydrogen chloride and then to lead into it, while irradiating it, a mixture of chlorine and nitrogen monoxide with which hydrogen chloride is also advantageously admixed. The most favorable molar ratio of $Cl_2:NO$ lies at about 1:3, but a smaller or greater molar ratio, for example between 1:8 and 2:1, may be used. The amount of hydrogen chloride to be added may vary within wide limits. If the hydrocarbon has been previously saturated with hydrogen chloride, it is not necessary to add hydrogen chloride to the mixture of chlorine and nitrogen monoxide or only a relatively small amount thereof need by added, for example 10 to 30 percent, with reference to the amount of chlorine used. In other cases about 50 percent of dry hydrogen chloride, with reference to the amount of chlorine used, is added to the mixture of chlorine and nitrogen monoxide.

The result of the coemployment of hydrogen chloride may be seen in the fact that immediately after commencement of irradiation with active light, the corresponding oxime hydrochloride begins to separate in an oily or solid form without the bis-nitroso compounds being formed. The chlornitroso compounds and polychlor compounds which are formed as byproducts in the process according to the said application S.N. 496,946 are not formed in the present process or only occur in very small amounts; nitro compounds or nitric acid or nitrous acid esters are also formed at the most in traces. The oximes are set free from the hydrochlorides obtained best by dissolving the latter in water and neutralizing the aqueous solution, for example with caustic alkali or ammonia solutions.

The following examples will further illustrate this invention but the invention is not restricted to these examples.

Example 1

240 grams of cyclohexane are saturated with dry hydrogen chloride and then a mixture of 750 ccs. of chlorine gas and 2,250 ccs. of nitrogen monoxide (with reference to normal conditions) is led in per hour at about 15° C. through a sieve plate, while irradiating with a mercury immersion lamp. It is advantageous to add to the gas mixture a further 200 ccs. of dry hydrogen chloride per hour so that the solution is continuously saturated with hydrogen chloride. After a short time an oil begins to separate which collects at the bottom of the reaction vessel and is run off from time to time. The oil is dissolved in water and neutralized with caustic soda solution, the cyclohexanone oxime thereby crystallizing out. By extraction of the cyclohexane layer with water and neutralization of the extract with caustic soda, further amounts of oxime are obtained. The total yield amounts to 6.2 to 6.5 grams of pale yellowish cyclohexanone oxime after 2½ hours duration of the reaction.

Example 2

250 grams of cyclo-octane are saturated at about 15° C. with dry hydrogen chloride and each hour there is led in through a sieve plate, while irradiating with a mercury immersion lamp, a mixture of 750 ccs. of chlorine and 2,250 ccs. of nitrogen monoxide to which preferably 200 ccs. of hydrogen chloride have been added so that the solution is continuously saturated with hydrogen chloride. At once the cyclo-octanone oxime hydrochloride begins to separate at the bottom of the vessel in crystalline form or as a viscous oil. By working up as in Example 1 there are obtained 13 grams of cyclooctanone oxime in all after 2½ hours duration of reaction.

Example 3

225 grams of n-heptane are charged into a reaction vessel and saturated therein with dry hydrogen chloride. Then a mixture of 690 ccs. of chlorine gas and 2,080 ccs. of nitrous oxide (with reference to normal conditions) is fed in per hour through a sieve plate at 20° C. and simultaneously exposed to the action of a mercury immersion lamp. Advantageously the feed of dry hydrogen chloride into the reactor is continued at a rate of 200 ccs. an hour in order to maintain constancy in the hydrogen chloride saturation of the solution. After a short time an oil commences to separate. It collects at the bottom from which it is run off from time to time. The oil is dissolved in water and neutralized with caustic soda solution, a mixture of isomeric heptanone oximes being separated as an oil. By extracting the n-heptane with water, neutralizing the extract with caustic soda solution and further extracting the aqueous solutions with ether further quantities of an oxime mixture with a boiling point of 104° to 107° C. at a pressure of 19 millimeters Hg are obtained. The overall yield is 5.0 to 5.5 grams of oximes after a two and one-half hours' duration of the reaction.

What we claim is:

1. An improved process for the production of ketoximes which comprises introducing a mixture of dry hydrogen chloride, nitrogen monoxide and chlorine in which the molar ratio $Cl_2:NO$ lies between about 1:8 and 2:1 into a normally liquid saturated hydrocarbon while irradiating with active light, separating the oxime hydrochlorides formed and neutralizing them.

2. An improved process for the production of ketoximes which comprises saturating a normally liquid saturated hydrocarbon with dry hydrogen chloride, introducing a mixture of nitrogen monoxide and chlorine in which the molar ratio $Cl_2:NO$ lies between about 1:8 and 2:1 while irradiating with active light, separating the oxime hydrochlorides formed and neutralizing them.

3. An improved process for the production of cyclohexanone oxime which comprises saturating cyclohexane with dry hydrogen chloride, introducing a mixture of dry chlorine gas, nitrogen monoxide and hydrogen chloride in which the molar ratio $Cl_2:NO:HCl$ is about 4:12:1 at about 15° C. while irradiating with active light, separating the cyclohexanone hydrochloride formed and neutralizing it by means of a caustic alkali solution.

4. An improved process for the production of cyclooctanone oxime which comprises saturating cyclooctane with dry hydrogen chloride, introducing a mixture of dry chlorine gas, nitrogen monoxide and hydrogen chloride in which the molar ratio $Cl_2:NO:HCl$ is about 4:12:1 at about 15° C. while irradiating with active light, separating the cyclooctanone oxime hydrochloride formed and neutralizing it by means of a caustic alkali solution.

5. An improved process for the production of a mixture of isomeric heptanone oximes which comprises saturating n-heptane with dry hydrogen chloride, introducing a mixture of dry chlorine gas, nitrogen monoxide and hydrogen chloride in which the molar ratio $Cl_2:NO:HCl$ is about 4:12:1 at about 15° C. while irradiating with active light, separating the mixture of oxime hydrochlorides formed and neutralizing it by means of a caustic alkali solution.

6. In a process for the production of ketoximes from a liquid saturated hydrocarbon, the improvement which comprises introducing a mixture of dry hydrogen chloride, nitrogen monoxide and chlorine in which the molar ratio $Cl_2:NO$ lies between about 1:8 and 2:1 into a liquid saturated hydrocarbon selected from the group consisting of alkanes and cycloalkanes having from 5 to 12 carbon atoms while irradiating with active light.

7. An improved process as claimed in claim 6 wherein the hydrocarbon is cyclohexane.

8. An improved process as claimed in claim 6 wherein the hydrocarbon is cyclooctane.

9. An improved process as claimed in claim 6 wherein the hydrocarbon is n-heptane.

References Cited in the file of this patent

FOREIGN PATENTS 992,772   France _____ July 11, 1951

OTHER REFERENCES

Chemical Reviews, vol. 48 (1951), page 324.